US011131230B2

(12) United States Patent
Inoue et al.

(10) Patent No.: US 11,131,230 B2
(45) Date of Patent: Sep. 28, 2021

(54) EXHAUST TREATMENT DEVICE FOR DIESEL ENGINE

(71) Applicant: KUBOTA Corporation, Osaka (JP)

(72) Inventors: Katsushi Inoue, Sakai (JP); Masanori Fujiwara, Sakai (JP); Hiroaki Okano, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 122 days.

(21) Appl. No.: 16/431,995

(22) Filed: Jun. 5, 2019

(65) Prior Publication Data

US 2019/0390588 A1 Dec. 26, 2019

(30) Foreign Application Priority Data

Jun. 26, 2018 (JP) .............................. JP2018-121152

(51) Int. Cl.
*F01N 9/00* (2006.01)
*F01N 11/00* (2006.01)
(Continued)

(52) U.S. Cl.
CPC ............ *F01N 9/002* (2013.01); *F01N 11/002* (2013.01); *B01D 46/0063* (2013.01); (Continued)

(58) Field of Classification Search
CPC .................. F01N 9/002; F01N 11/002; F01N 2900/1611; B01D 46/0086; B01D 46/444; B01D 46/446; B01D 46/448
See application file for complete search history.

(56) References Cited

U.S. PATENT DOCUMENTS

2004/0211159 A1  10/2004 Hamahata et al.
2010/0102828 A1* 4/2010 Bromberg ............... F01N 9/002
                                                          324/639
(Continued)

FOREIGN PATENT DOCUMENTS

DE    102011018486 A1   10/2012
DE    112016004177 T5    5/2018
(Continued)

OTHER PUBLICATIONS

Extended European Search Report dated Jul. 9, 2019 in EP Application No. 19175396.1.
Office Action dated Apr. 28, 2021 in JP Application No. 2018-121152.

*Primary Examiner* — Ngoc T Nguyen
(74) *Attorney, Agent, or Firm* — Panitch Schwarze Belisario & Nadel LLP

(57) ABSTRACT

There is provided an exhaust treatment device for a diesel engine capable of accurately estimating an amount of ash deposition. In the exhaust treatment device, an ash deposition estimation device estimates an amount of ash deposition on a DPF after ending of regenerating treatment for the DPF, based on data regarding differential pressure and exhaust flow rate stored in a memory device over a period immediately before the end of regeneration, the period ranging from the end point of regenerating treatment for the DPF to a point in time going back a predetermined duration. An electronic control device preferably makes an alarm device issue an alarm, upon arrival of an estimated value of ash deposition at a predetermined alarm request value.

6 Claims, 2 Drawing Sheets

(51) Int. Cl.
*B01D 46/00* (2006.01)
*B01D 46/44* (2006.01)
*B01D 46/46* (2006.01)
*F01N 3/023* (2006.01)

(52) U.S. Cl.
CPC ........ *B01D 46/0086* (2013.01); *B01D 46/444* (2013.01); *B01D 46/446* (2013.01); *B01D 46/448* (2013.01); *B01D 46/46* (2013.01); *B01D 2279/30* (2013.01); *F01N 3/023* (2013.01); *F01N 2550/04* (2013.01); *F01N 2560/06* (2013.01); *F01N 2560/07* (2013.01); *F01N 2560/08* (2013.01); *F01N 2900/0601* (2013.01); *F01N 2900/08* (2013.01); *F01N 2900/1404* (2013.01); *F01N 2900/1411* (2013.01); *F01N 2900/1606* (2013.01); *F01N 2900/1611* (2013.01)

(56) References Cited

U.S. PATENT DOCUMENTS

| | | | | |
|---|---|---|---|---|
| 2015/0361860 | A1* | 12/2015 | Qi | F01N 9/002 60/286 |
| 2016/0326934 | A1* | 11/2016 | Kim | F01N 9/002 |
| 2018/0149102 | A1* | 5/2018 | Kobashi | F02D 41/3005 |

FOREIGN PATENT DOCUMENTS

| | | |
|---|---|---|
| EP | 1437493 A1 | 7/2004 |
| EP | 2218884 A1 | 8/2010 |
| JP | H7224635 A | 8/1995 |
| JP | 2004076605 A | 3/2004 |
| JP | 2006-105056 A | 4/2006 |
| JP | 2009138704 A | 6/2009 |
| JP | 2009270503 A | 11/2009 |
| WO | 2012030278 A1 | 3/2012 |

* cited by examiner

EXHAUST TREATMENT DEVICE FOR DIESEL ENGINE

CROSS-REFERENCE TO RELATED APPLICATION

This application claims priority under 35 U.S.C. § 119(b) to Japanese Patent Application No. 2018-121152, filed Jun. 26, 2018, the disclosure of which is incorporated herein by reference in its entirety.

BACKGROUND OF THE INVENTION

(1) Field of the Invention

The present invention relates to an exhaust treatment device for a diesel engine.

(2) Description of Related Art

In a conventional exhaust treatment device for a diesel engine, an electronic control device estimates an amount of ash deposition based on differential pressure between an exhaust inlet side and an exhaust outlet side of the DPF, immediately after an end of DPF regenerating treatment. The differential pressure and exhaust flow rate, however, largely vary immediately after the end of the DPF regenerating treatment due to variation in engine load and rotational speed of engine, making it difficult to accurately estimate the amount of ash deposition.

SUMMARY OF THE INVENTION

It is therefore an object of the present invention to provide an exhaust treatment device for a diesel engine capable of accurately estimating an amount of ash deposition.

In the present invention, an exhaust treatment device is designed to make an ash deposition estimation device estimate an amount of ash deposition on a DPF after an end of regenerating treatment for the DPF, based on data regarding differential pressure and exhaust flow rate stored in a memory device over a period immediately before the end of regeneration, the period ranging from the end point of regenerating treatment for the DPF to a point in time going back a predetermined duration.

According to the present invention, it is possible to estimate the amount of ash deposition accurately.

DETAILED DESCRIPTION OF PREFERRED EMBODIMENTS

Figure 1:
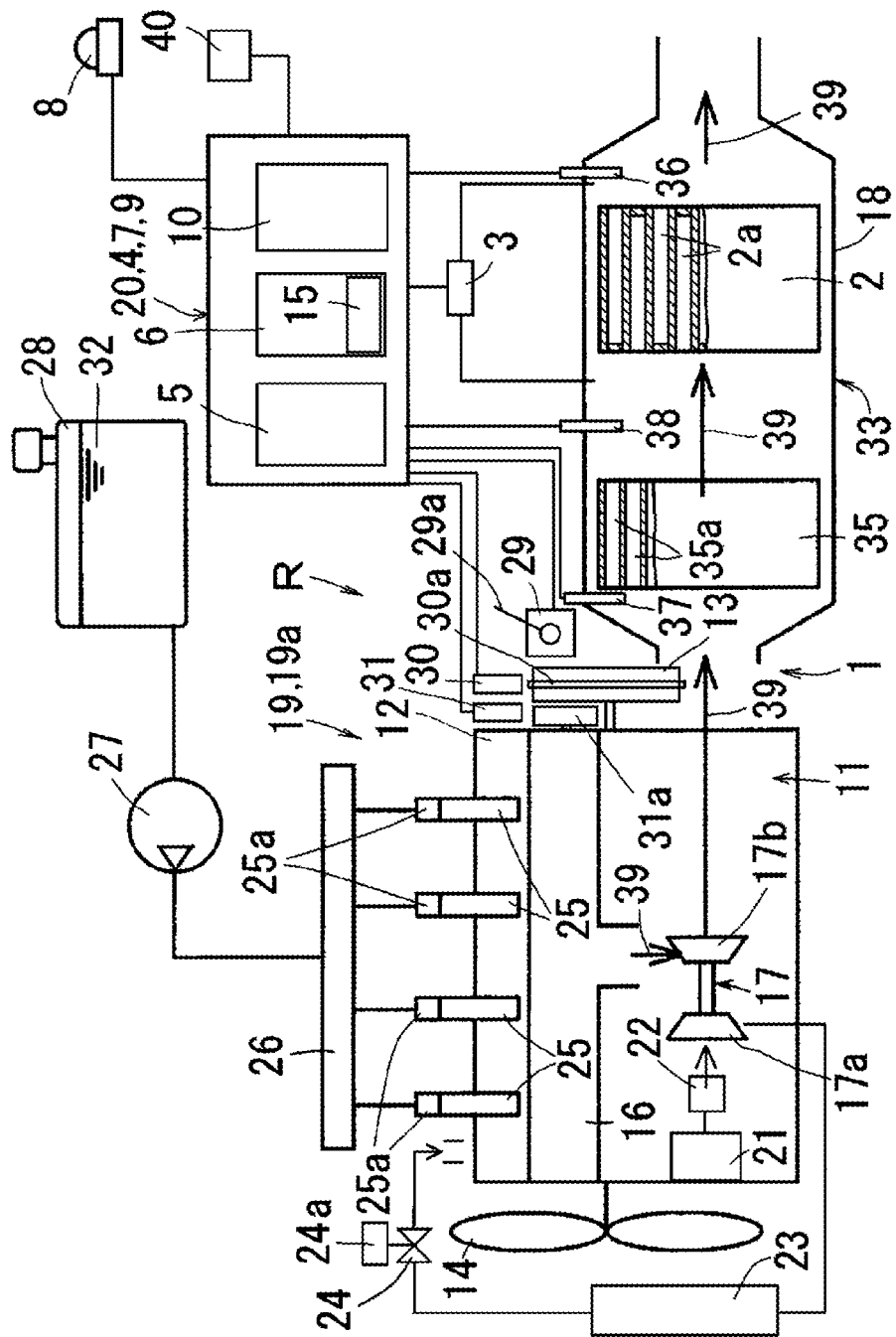
FIG. 1 is a schematic diagram of an engine according to an embodiment of the present invention.
Figure 2:
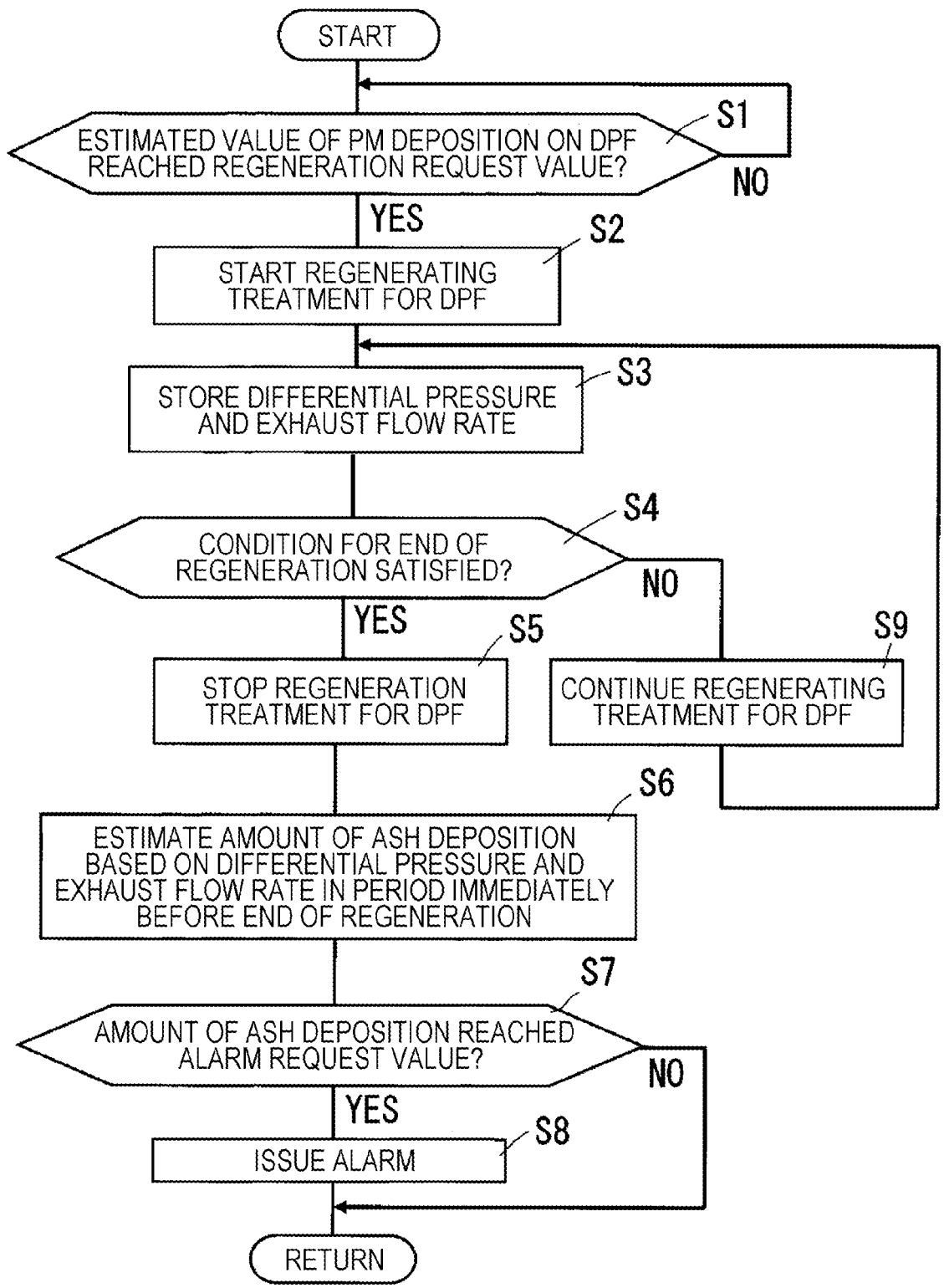
FIG. 2 is a flowchart illustrating a process carried out by an electronic control device of the engine illustrated in FIG. 1.

FIGS. 1 and 2 illustrate an engine according to an embodiment of the present invention. In this embodiment, a vertical water-cooled, in-line, four-cylinder diesel engine equipped with an exhaust treatment device will be explained.

The engine will be outlined below.

As illustrated in FIG. 1, the engine has a cylinder block (11), a cylinder head (12) assembled on an upper part of the cylinder block (11), a flywheel (13) disposed on the rear side of the cylinder block (11), an engine cooling fan (14) disposed on the front side of the cylinder block (11), an intake manifold (not illustrated) disposed on one lateral side of the cylinder head (12), an exhaust manifold (16) disposed on the other lateral side of the cylinder head (12), a supercharger (17) connected to the exhaust manifold (16), and, an exhaust treatment case (18), a fuel supply device (19a), and an electronic control device (20) which are disposed on the exhaust downstream side of the supercharger (17).

An intake device will be outlined below.

As illustrated in FIG. 1, the intake device has a compressor (17a) of the supercharger (17), an air cleaner (21) disposed on the intake upstream side of the compressor (17a), an air flow sensor (22) disposed between the air cleaner (21) and the compressor (17a), an intercooler (23) disposed on the exhaust downstream side of the compressor (17a), an intake throttle valve (24) disposed on the intake downstream side of the intercooler (23), and an intake manifold (not illustrated) disposed on the intake downstream side of the intake throttle valve (24).

The air flow sensor (22), and an electric actuator (24a) of the intake throttle valve (24) are electrically connected to the electronic control device (20).

For the electronic control device (20), used is an engine ECU. ECU is an abbreviation for electronic control unit, which is a microcomputer.

The fuel supply device (19a) will be outlined as below.

As illustrated in FIG. 1, the fuel supply device (19a) is of common rail type, and has a plurality of fuel injectors (25) inserted to the individual cylinders, a common rail (26) that distributes a fuel stored under pressure to the plurality of fuel injectors (25), a fuel supply pump (27) that pumps the fuel to the common rail (26), and a fuel tank (28).

The fuel supply pump (27), and a solenoid valve (25a) of the fuel injector (25) are electrically connected to the electronic control device (20). To the electronic control device (20), electrically connected are an accelerator sensor (29), a crankshaft sensor (30), and a cylinder discrimination sensor (31). The accelerator sensor (29) detects a target rotational speed of engine, and the crankshaft sensor (30) detects an actual rotational speed of engine and crank angle. The cylinder discrimination sensor (31) detects combustion stroke of the individual cylinders.

In the fuel supply device (19a), engine load is calculated by the electronic control device (20), based on deviation between target rotational speed and actual rotational speed of the engine; the solenoid valve (25a) of the fuel injector (25) is opened in a predetermined timely manner for a predetermined length of time, corresponding to the target rotational speed of the engine and the engine load; and fuel injector (25) injects a predetermined volume of fuel (32) to the individual cylinders in a predetermined timely manner. The fuel (32) is now a diesel fuel.

As illustrated in FIG. 1, the accelerator sensor (29) is a device that detects a preset position of the accelerator lever (29a) pointing the target rotational speed. A potentiometer is used for the accelerator sensor (29).

As illustrated in FIG. 1, the crankshaft sensor (30) detects passage of projections of a crankshaft detection disk (30a) attached to the flywheel (13). The crankshaft detection disk (30a) has, along its circumference, one reference projection and a large number of phase projections arranged at regular intervals. Using passing speed of these projections, the electronic control device (20) calculates the actual rotational speed of the engine, and calculates the crank angle based on phase difference between the phase projections having been passed and the reference projection.

The cylinder discrimination sensor (31) detects passage of projections of a cylinder discrimination disk (31a) attached to a camshaft of a valve train (not illustrated). The cylinder discrimination disk (31a) has one projection on its circumference. Referring to passage of this projection, the electronic control device (20) discriminates 4-cycle combustion strokes.

An electromagnetic pickup sensor is now used for the crankshaft sensor (30) and the cylinder discrimination sensor (31).

The exhaust device will be outlined below.

As illustrated in FIG. 1, the exhaust device has the exhaust manifold (16), an exhaust turbine (17b) of the supercharger (17) disposed on the exhaust downstream side of the exhaust manifold (16), and an exhaust treatment device (33) provided on the exhaust downstream side of the exhaust turbine (17b). A series of paths from the exhaust manifold (16) up to the exhaust treatment device (33) makes up an exhaust path (1).

The exhaust treatment device (33) will be outlined below.

The exhaust treatment device (33) has the exhaust treatment case (18) disposed on the exhaust downstream side of the exhaust turbine (17b) of the supercharger (17), a DOC (35) disposed on the exhaust upstream side inside the exhaust treatment case (18), and a DPF (2) disposed on the exhaust downstream side in the exhaust treatment case (18).

The DPF, abbreviation from diesel particular filter, captures PM in engine exhaust. PM is an abbreviation for particulate matter. As illustrated in FIG. 1, the DPF (2) uses a wall-flow type ceramic honeycomb structure having inside a large number of cells (2a) that are juxtaposed along the axial length direction, with the inlet and the outlet of neighboring cells (2a) (2a) alternately plugged.

The DOC, abbreviated from diesel oxide catalyst, oxidizes CO (carbon monoxide) and NO (nitrogen monoxide) contained in the engine exhaust. The DOC (35) uses a flow-through type ceramic honeycomb structure having inside a large number of cells (35a) that are juxtaposed along the axial length direction in a penetrating manner, with an oxidizing catalyst component such as platinum, palladium or rhodium supported in the cells.

The exhaust treatment device (33) has a regenerator (R) for the DPF (2).

The regenerator (R) for the DPF (2) has a PM deposition estimation device (4) that estimates an amount of deposition of PM deposited on the DPF (2), and the electronic control device (20), and is designed to make the electronic control device (20) carry out regenerating treatment for the DPF (2), upon arrival of the amount of PM deposition on the DPF (2) at a predetermined regeneration request value. In the regenerating treatment for the DPF (2), an exhaust (39) is heated by an exhaust heater (19), and PM deposited on the DPF (2) is combusted.

The PM deposition estimation device (4) has the electronic control device (20), and estimates the amount of PM deposition on the DPF (2), from the differential pressure detected by a differential pressure sensor (3) that detects differential pressure between an exhaust inlet side and an exhaust outlet side of the DPF (2). The amount of PM deposition on the DPF (2) may alternatively be estimated based on an integrated time of engine operation or integrated value of fuel supply volume, in place of using the differential pressure detected at the DPF (2).

The exhaust heater (19) has the intake throttle valve (24), the fuel supply device (19a), the DOC (35), an exhaust temperature sensor (37) disposed on the DOC inlet side which detects exhaust temperature on the exhaust inlet side of the DOC (35), an exhaust temperature sensor (36) disposed on the DPF outlet side which detects exhaust temperature on the exhaust outlet side of the DPF (2), and an exhaust temperature sensor (38) disposed on the DPF inlet side which detects exhaust temperature on the exhaust inlet side of the DPF (2).

Each of the sensors (36) (37) (38) is electrically connected to the electronic control device (20).

As illustrated in FIG. 1 in the exhaust treatment device (33), PM contained in the exhaust (39) from the engine is captured by the DPF (2), the PM deposited on the DPF (2) is continuously oxidized or combusted at relatively low temperatures using nitrogen dioxide ($NO_2$) obtained by oxidizing nitrogen monoxide (NO) in the exhaust (39) using the DOC (35). Then upon arrival of the differential pressure detected by the differential pressure sensor (3) at the predetermined regeneration request value, the common rail type fuel supply device (19a) performs post injection, while being controlled by the electronic control device (20), so as to subject unburnt fuel fed to the exhaust (39) to catalytic combustion in the DOC (35), thereby the exhaust (39) is heated, and the PM deposited on the DPF (2) is combusted at relatively high temperatures. The DPF (2) is thus regenerated.

If the exhaust temperature is low, and the inlet side exhaust temperature of the DOC (35) does not reach an activation temperature of the DOC (35), the intake throttle valve (24) is throttled under the control by the electronic control device (20), so as to elevate the exhaust temperature.

Start point of the DPF regenerating treatment is defined as described below.

If the inlet exhaust temperature of the DOC (35) has reached the activation temperature of the DOC (35) at a time point the differential pressure detected by the differential pressure sensor (3) reached the regeneration request value, and the post injection starts at this time point, such start point of post injection is defined to be the start point of the DPF regenerating treatment.

If inlet exhaust temperature of the DOC (35) has not reached the activation temperature of the DOC (35) at a time point where the differential pressure detected by the differential pressure sensor (3) reached the regeneration request value, and the intake throttle valve (24) is tightened, a start point where the intake throttle valve (24) is tightened is defined to be the start point of the DPF regenerating treatment. In this case, a time point where the post injection is started, upon arrival of the inlet exhaust temperature of the DOC (35) at the activation temperature of the DOC (35), may be defined to be the start point of the DPF regenerating treatment.

Note that, in place of the post injection using the common rail type fuel supply device (19a), employable is exhaust pipe injection by which unburnt fuel is injected into the exhaust (39), through an exhaust pipe fuel injector (not illustrated) disposed between the exhaust turbine (17b) of the supercharger (17) and the DOC (35). Alternatively, the exhaust may be heated making use of heat generation of an electric heater or throttling of an exhaust throttle valve, in place of the post injection using the common rail type fuel supply device (19a).

The engine is equipped with an ash deposition alarm device that alarms ash deposition in the DPF.

The ash means an ash composed of zinc compound, calcium compound and so forth.

The zinc compound is derived from anti-wear agent or antioxidant contained in engine oil, meanwhile the calcium compound is derived from cleaning agent or acid neutralizer contained in the engine oil.

As illustrated in FIG. 1, the engine has an estimation device for estimating the amount of ash deposition.

The estimation device for estimating the amount of ash deposition has the exhaust temperature sensor (38) on the inlet side of the DPF, the differential pressure sensor (3), an exhaust flow rate calculation device (9), a memory device (6), a timer (5), and an ash deposition estimation device (7).

The electronic control device (20), during the regenerating treatment for the DPF (2), is designed to keep the exhaust temperature within a predetermined range, based on the exhaust temperature detected by the exhaust temperature sensor (38) disposed on the inlet side of the DPF; and concurrently as illustrated in FIG. 2, to make the memory device (6) store (S3) data regarding differential pressure between the exhaust inlet side and the exhaust outlet side of the DPF (2) detected by the differential pressure sensor (3), and exhaust flow rate calculated by the exhaust flow rate calculation device (9); and to make the ash deposition estimation device (7) estimate (S6) the amount of ash deposition on the DPF (2) after an end of regenerating treatment (S5) for the DPF (2), based on the data regarding the differential pressure and the exhaust flow rate stored in the memory device (6) over a period immediately before the end of regeneration, the period ranging from the end point of regenerating treatment for the DPF (2) to a point in time going back a predetermined duration. In the period immediately before the end of regeneration, the differential pressure and the exhaust flow rate may vary only to a small degree, since the exhaust temperature is kept within a predetermined range. Moreover, PM that would otherwise interfere with estimation of the amount of ash deposition is sufficiently combusted, enabling accurate estimation of the amount of ash deposition.

As illustrated in FIG. 1, the memory device (6) and the timer (5) are incorporated in the electronic control device (20). The PM deposition estimation device (4), the ash deposition estimation device (7) and the exhaust flow rate calculation device (9) are composed of the electronic control device (20). The electronic control device (20) incorporates a CPU. CPU is an abbreviation for central processing unit.

For the memory device (6), employable is a non-volatile memory incorporated in the electronic control device (20), which is exemplified by flash memory, P-ROM, EP-ROM, and E2P-ROM.

As illustrated in FIG. 1, the engine has an alarm device (8), and the electronic control device (20) is designed to make the alarm device (8) issue an alarm, upon arrival of an estimated value of the amount of ash deposition at a predetermined alarm request value.

Hence, by such alarm, an engine operator can be notified of necessity of ash cleaning.

The alarm device (8) is composed of an alarm lamp electrically connected to the electronic control device (20), and an alarm is issued by illumination of the alarm lamp. A light emitting diode is used for the alarm lamp.

In place of the alarm lamp, a display such as liquid crystal display or organic EL display is employable for the alarm device (8), so as to issue the alarm in the form of letters, figures or symbols. EL is an abbreviation for electro-luminescence.

In place of the alarm lamp, an alarm sound generating device such as alarm buzzer or alarm bell is employable for the alarm device (8), so as to issue the alarm in the form of alarm sound.

As illustrated in FIG. 1, the engine has the air flow sensor (22), an atmospheric pressure sensor (40), and a fuel supply map.

The electronic control device (20) is designed to make the exhaust flow rate calculation device (9) calculate the exhaust flow rate, based on the intake flow rate measured by the air flow sensor (22), the atmospheric pressure detected by the atmospheric pressure sensor (40), the differential pressure detected by the differential pressure sensor (3), and the fuel supply volume measured by the fuel supply map (15).

The fuel supply map (15) is stored in the memory device (6), and have entered therein fuel supply volume corresponding to rotational speed of engine and engine load.

Since the exhaust flow rate in this case is calculated based on the intake flow rate, the atmospheric pressure, the differential pressure, and the fuel supply volume, the exhaust flow rate may be estimated accurately.

The exhaust flow rate is volumetric flow rate of exhaust per unit time, and is determined by converting the intake flow rate measured by the air flow sensor (22), using the equation below:

$$V(m^3/sec)=[G(g/sec)/28.8\ (g/mol)]\times 22.4\times 10^{-3}\ (m^3/mol)\times[T(K)/273\ (K)]\times[P0\ (kPa)/(P0\ (kPa)+\Delta P\ (kPa))]+Q\ (cc/sec)/207.3\ (g/mol)\times 0.84\ (g/cc)\times 6.75\times 22.4\times 10^{-3}\ (m^3/mol)\times[P0\ (kPa)/(P0\ (kPa)+\Delta P\ (kPa))],$$

in which V (m³/sec) represents the volumetric flow rate of exhaust per unit time, G (g/sec) represents mass flow rate of intake per unit time, T (K) represents DPF temperature, P0 (kPa) represents the atmospheric pressure, ΔP (kPa) represents differential pressure over the DPF, and Q (cc/sec) represents fuel supply volume per unit time. The DPF temperature is estimated from inlet exhaust temperature of the DPF (2).

The first term on the right side of the equation represents a volumetric flow rate of intake converted from the mass flow rate.

The second term on the right side of the equation represents an increment from the intake to exhaust gas as a result of combustion of injected fuel. In the second term, the numeral 0.84 (g/cc) is a representative liquid density of diesel fuel. The numeral 22.4×10⁻³ (m³/mol) represents the molar volume of ideal gas at 0° C., 1 atm. The numeral 6.75 represents the rate of increase in number of moles of exhaust gas per mol of the amount of injected fuel.

The amount of ash deposition can be estimated using converted differential pressure PC (kPa·sec/m³) obtained by dividing the differential pressure ΔP (kPa) over the DPF (2) by the exhaust flow rate V (m³/sec). If the converted differential pressure PC reaches a predetermined value (50 kPa·sec/m³, for example), an estimated value of the amount of ash deposition is considered to reach the predetermined alarm request value.

In this engine, a simple estimation of exhaust flow rate may alternatively be employed, in place of the aforementioned accurate estimation of exhaust flow rate.

More specifically, the engine may alternatively be designed to have the air flow sensor (22), in which the electronic control device (20) may make the exhaust flow rate calculation device (9) calculate the exhaust flow rate, while assuming the intake flow rate measured by the air flow sensor (22) as the exhaust flow rate.

Since the exhaust flow rate in this case is calculated while assuming the intake flow rate as the exhaust flow rate, the exhaust flow rate may be estimated in a simple manner.

Procedures of DPF regeneration, estimation of the amount of ash deposition and so forth, carried out by the electronic control device, will be described referring to the flowchart.

As illustrated in FIG. 2, in step (S1), whether the estimated value of the amount of PM deposition on the DPF (2) has reached the predetermined regeneration request value or not is determined. The determination is repeated until the result turns into YES, and upon determination of YES, the process goes to step (S2).

In step (S2), the DPF regenerating treatment starts, and the process goes to step (S3). In the DPF regenerating treatment, the intake throttle valve (24) will be tightened if the inlet exhaust temperature of the DOC (35) has not reached the activation temperature of the DOC (35), and upon arrival at the activation temperature, unburnt fuel is fed to the exhaust (39) by post injection by the fuel supply device (19a), the unburnt fuel is subjected to catalytic combustion in the DOC (35), the exhaust temperature elevates, and thereby the PM deposited on the DPF (2) is removed by combustion.

In step (S3), the differential pressure between the exhaust inlet side and the exhaust outlet side of the DPF, and the exhaust flow rate are stored. The process then goes to step (S4).

In step (S4), whether the condition for the end of regeneration has been satisfied or not is determined. If the determination is YES, the process goes to step (S5).

The condition for the end of regeneration means that an integrated time (i.e. time period), over which the inlet exhaust temperature of the DPF is kept at a predetermined regeneration request temperature (at around 500° C., for example) as a result of post injection, reaches a predetermined set time for ending.

Note that, if the outlet exhaust temperature of the DPF becomes abnormally high (at around 700° C., for example) during the DPF regeneration, the post injection is interrupted in order to avoid heat damage of the DPF (2).

In step (S5), the DPF regenerating treatment is ended. The process then goes to step (S6).

In step (S6), the amount of ash deposition is estimated from the differential pressure and the exhaust flow rate in the period immediately before the end of regeneration. The process then goes to step (S7). In this embodiment, the period immediately before the end of regeneration is set as a period that ranges from the end point of regeneration to a point in time going back a predetermined duration (10 minutes).

In step (S7), whether the amount of ash deposition has reached the predetermined alarm request value or not is determined. If the determination is YES, the process goes to step (S8).

In step (S8), an alarm is issued, and the process goes back to step (S1).

The alarm is cancelled upon confirming removal of ash from the DPF (2) by cleaning, or replacement of the DPF (2).

If the determination in step (S4) is NO, the process goes to step (S9).

In step (S9), the regenerating treatment for the DPF (2) is kept continued, and the process goes back to step (S3).

If the determination in step (S7) is NO, the process goes back to step (S1), without issuing the alarm in step (S8).

What is claimed is:

1. An exhaust treatment device for a diesel engine, the exhaust treatment device comprising:
    a diesel particular filter disposed on an exhaust path;
    a particulate matter deposition estimation device that estimates an amount of deposition of particulate matter deposited on the diesel particular filter;
    an electronic control device that performs regenerating treatment for the diesel particular filter, upon arrival of the amount of particulate matter deposition on the diesel particular filter at a predetermined regeneration request value;
    an exhaust temperature sensor;
    a differential pressure sensor;
    an exhaust flow rate calculation device;
    a memory device;
    a timer; and
    an ash deposition estimation device,
    wherein
    the memory device stores data regarding differential pressure between an exhaust inlet side and an exhaust outlet side of the diesel particular filter detected by the differential pressure sensor, and exhaust flow rate calculated by the exhaust flow rate calculation device, and
    the ash deposition estimation device estimates an amount of ash deposition on the diesel particular filter after ending of regenerating treatment for the diesel particular filter, based on the data regarding the differential pressure and the exhaust flow rate stored in the memory device over a period immediately before the end of regeneration, the period ranging from an end point of regenerating treatment for the diesel particular filter to a point in time going back a predetermined duration.

2. The exhaust treatment device according to claim 1, further comprising an alarm device,
    wherein the electronic control device makes the alarm device issue an alert, upon arrival of an estimated value of the ash deposition at a predetermined alarm request value.

3. The exhaust treatment device according to claim 1, further comprising an air flow sensor, an atmospheric pressure sensor, and a fuel supply map,
    wherein the electronic control device makes the exhaust flow rate calculation device calculate the exhaust flow rate, based on intake flow rate measured by the air flow sensor, atmospheric pressure detected by the atmospheric pressure sensor, differential pressure detected by the differential pressure sensor, and fuel supply volume measured by the fuel supply map.

4. The exhaust treatment device according to claim 2, further comprising an air flow sensor, an atmospheric pressure sensor, and a fuel supply map,
    wherein the electronic control device makes the exhaust flow rate calculation device calculate the exhaust flow rate, based on intake flow rate measured by the air flow sensor, atmospheric pressure detected by the atmospheric pressure sensor, differential pressure detected by the differential pressure sensor, and fuel supply volume measured by the fuel supply map.

5. The exhaust treatment device according to claim 1, further comprising an air flow sensor,
    wherein the electronic control device considers intake flow rate measured by the air flow sensor as the exhaust flow rate, and makes the exhaust flow rate calculation device calculate the exhaust flow rate.

6. The exhaust treatment device according to claim 2, further comprising an air flow sensor, wherein the electronic control device considers intake flow rate measured by the air flow sensor as the exhaust flow rate, and makes the exhaust flow rate calculation device calculate the exhaust flow rate.

* * * * *